US008429008B2

(12) United States Patent
Yun

(10) Patent No.: US 8,429,008 B2
(45) Date of Patent: Apr. 23, 2013

(54) CALCULATION METHOD OF SALES COMMISSION USING TRANSFORMATION COEFFICIENT IN ON-LINE, CALCULATION SYSTEM AND RECORDING MEDIUM THEREOF

(76) Inventor: Keun Soo Yun, Seoul (KR)

(*) Notice: Subject to any disclaimer, the term of this patent is extended or adjusted under 35 U.S.C. 154(b) by 334 days.

(21) Appl. No.: 12/701,984

(22) Filed: Feb. 8, 2010

(65) Prior Publication Data

US 2010/0205051 A1 Aug. 12, 2010

(30) Foreign Application Priority Data

Feb. 9, 2009 (KR) .................. 10-2009-0010091

(51) Int. Cl.
*G06Q 30/00* (2006.01)
*G05B 19/418* (2006.01)

(52) U.S. Cl.
USPC .................. 705/14.16; 705/26.1; 705/30

(58) Field of Classification Search ........... 705/26.1, 705/30
See application file for complete search history.

(56) References Cited

U.S. PATENT DOCUMENTS 6,618,706 B1 * 9/2003 Rive et al. .............. 705/30
2001/0011236 A1 * 8/2001 Shell ....................... 705/26

OTHER PUBLICATIONS

Understanding binary compensation plan. http://www.network-marketing-business-school.com/Binary-Plan.html . Oct. 2007.*

* cited by examiner

*Primary Examiner* — Victoria Vanderhorst
(74) *Attorney, Agent, or Firm* — Kile Park Reed & Houtteman PLLC

(57) ABSTRACT

Disclosed are a method and a system of calculating a sales commission using a transformation coefficient in on-line by reflecting sales of members receiving sales commissions and new sales of sub-members, and a record medium thereof. Members receive sales commissions based on members' own sales, so that old sub-members as well as new members actively sell commodities. The property of the tree to which the members belong is more increased, so that the members have reliability and affection for a company. The revenue of the members is more increased, and a company attempts to increase sales and members. A company determines sales commissions paid to members at a constant commission payment rate for the sales of the members without being affected by the enlargement of an organization due to the increase of the members and the amount of sales.

13 Claims, 6 Drawing Sheets wire/wireless communication system

CALCULATION METHOD OF SALES COMMISSION USING TRANSFORMATION COEFFICIENT IN ON-LINE, CALCULATION SYSTEM AND RECORDING MEDIUM THEREOF

BACKGROUND OF THE INVENTION

1. Field of the Invention

The present invention relates to a method and a system of calculating a sales commission using a transformation coefficient in on-line and a record medium thereof. More particularly, the present invention relates to a method and a system of calculating a sales commission using a transformation coefficient in on-line by reflecting sales of members receiving sales commissions and new sales of sub-members, and a record medium thereof.

2. Description of the Related Art

Multi-level marketing, which has created a great sensation in society, employs a direct transaction of linking producers with consumers through multi-level marketing companies. The multi-level marketing is a plan to introduce commodities by word of mouth of multi-level marketing members without a typical marketing structure, such as a sole agency, an agency, and wholesale/retail stores, between producers and consumers. Accordingly, the multi-level marketing has been spotlighted in that mutual profits between the producers and consumers are promoted by saving marketing cost and advertisement cost and returning profits obtained from the saved cost to members who are sales persons of a multi-level marketing company.

In addition, the multi-level marketing is referred to as "network business" in order to make a difference from a pyramid plan that has caused serious problems. Such a network business allows marketing members to perform a non-store and no guaranteed business without an investment fund as consumers as well as sale persons. Such a sales plan has many advantages because there is no time limitation, stored goods, a credit and employees. Accordingly, the network business has been widely spread as an individual business in developed countries and has been regarded as a progressive commercial scheme.

The network business employs various plans such as a binary plan, a matrix plan, a unilevel plan, and a hybrid plane according to schemes of training marketing members and calculating a sales commission. Among the planes, the binary plan used by many companies is a scheme to train members in two tree organizations in a narrow sense as shown in FIG. 1. In a wide sense, as shown in FIGS. 2A and 2B, the binary plan is a scheme to calculate and provide a sales commission by classifying the whole organization into two groups regardless of the number of trained tree organizations when the sales commission is calculated and applying a predetermined rate to a group having lower new sales.

For example, as shown in FIG. 2A, a member a positioned in the uppermost layer manages membership organization in 3 tree structures. However, when calculating a sales commission, members belonging to a first tree structure shown in the left of a membership organization view may be handled in one organization, and members belonging to second and third tree structures shown in the right of the membership organization view may be handled in one organization. As described above, after dividing members into two organizations, a sales commission may be calculated by applying a predetermined rate to the sales of an organization having lower sales, and may be provided to the member a.

However, according to the typical binary plan which calculates and provides a sales commission by comparing new sales of the two organizations with each other and applying a predetermined rate to the new sales having a lower value (hereinafter, the predetermined rate will be referred to as a lower-sales related payment rate), the sales commission actually provided to a member may not match with a proportion in the total new sales. In extreme case, the sales commission may exceed the total new sales. The problems may be more deepened as the number of members is gradually increased to expand an organization and new sales are increased.

For examples, in the tree of FIG. 3, new sales are increased by 100 by members H, I, . . . , N, and O in the lowermost layer, and the lower-sales related payment rate preset by a company is 20%. In the tree having the above structure, members A, B, . . . , F, and, G who are positioned above the members H, I, . . . , N, and O in the lowermost layer receive sales commissions. For example, the members A, B, . . . , F, and G may receive sales commissions because the members A, B, . . . , F, and G bring the increase (e.g., 100) of sales that is the minimum requirement for a sales commission. In FIG. 3, a number in a round bracket for each member represents sales of the member.

Since the total new sales of the left organization or the right organization of the member A are 400, the member A receives a sales commission of 80 corresponding to a lower-sales related payment rate of 20%. Since new sales of the left or right organization of the members B and C are 200, the members B and C receive a sales commission of 40 corresponding to the lower-sales related payment rate of 20%. Since new sales of the left or right organization of the members D to G are 100, the members D to G receive a sales commission of 20 corresponding to the lower-sales related payment rate of 20%.

The total sales commissions paid to the members A to G are 240 in relation to the total new sales of 800 achieved by the members H to O in the lowermost layer. The total sales commissions occupy 30% of 800 (total new sales), and exceed the lower-sales related payment rate of 20%.

This phenomenon remarkably occurs as the new sales are increased and the tree structure is complicated. For example, the calculation of a paid sales commission in the tree of FIG. 4 will be described below. According to the present embodiment, new sales achieved by each of members a to p in the lowermost layer may be 100, and a lower-sales related payment rate preset by a company may be 20%. In the tree having the structure, the members A to O positioned above the members a to p in the lowermost layer receive sales commissions.

The member A receives a sales commission of 160 corresponding to a lower-sales related payment rate of 20% because new sales of the left organization or the right organization of the member A are 800. The members B and C receive sales commissions of 80 corresponding to the lower-sales related payment rate of 20% because new sales of their left or right organization are 400. The members D to G receive sales commissions of 40 corresponding to the lower-sales related payment rate of 20% because new sales result of their left or right organization are 200. The members H to O receive sales commissions of 20 corresponding to the lower-sales related payment rate of 20% because new sales of their left or right organization are 100.

The total sales commissions paid to the member A to O are 240 in relation to 1600 that are the total new sales achieved by the members a to p. This sum of the sales commissions occupies 40% of 1600 (the total new sales), and exceeds the lower-sales related payment rate of 20%. When comparing to the tree shown in FIG. 3, even though the whole sales are increased by twice, sales commissions are increased by about 2.7 times.

According to the typical binary plan of presetting a predetermined rate for lower new sales and calculating sales commissions, a company cannot constantly determine the rate of the sales commission to be paid to members. In addition, as the number of members is increased, and the structure of the tree is complicated, the sales commissions for the members may be greater than new sales.

Therefore, the company attempts to reduce the lower-sales related payment rate in order to prevent bankruptcy. In this case, since members are not reliable for a reward plan, they may withdraw from the company.

In a typical scheme of calculating a sales commission, only new sales of sub-members are reflected on the calculation of sales commissions of old members except for old members' own sales. As a result, the sales of the old members are fixed to the minimum sales preset by the company for the members having the qualification of receiving the sales commission. This is because the members prefer to receive sales commissions while maintaining the minimum sales. Therefore, even if the minimum qualification condition for sales commissions is established, the excessive payment of sales commissions cannot be solved.

Another scheme of paying a sales commission in proportion to sales of members may be suggested. For example, the member B may accomplish sales of 200, and other members may accomplish the minimum sales of 100 in the trees shown in FIGS. 3 and 4. In this case, a lower-sales related payment rate provided to the member B may be 40% corresponding to twice a lower-sales related payment rate of other members. In the case of FIG. 3, the member B receives a sales commission of 80 corresponding to 40% for the new sales of 200 achieved by the right or left organization of the member B. In the case of FIG. 4, the member B receives a sales commission of 160.

Even though these cases may have an advantage in that the sales commission for a member is calculated based on the sales of the member, the sales commission may be more excessively paid.

As described above, even if a company employing such a scheme of calculating the sales commission has many members, the company depends on only new sales of new members, and does not expect old members to increase sales due to the re-purchase or sale activity of goods of the company.

In addition, since sales of members resulting from repeated-purchasing or selling goods are not reflected on sales commissions of the members, the members may be passive about repeated-repurchasing or selling goods.

Accordingly, a scheme and a system of calculating a sales commission, which can be stably managed by constantly establishing the ratio of a sales commission to the total sales while reflecting sales of members on the sales commission for the members, have been required.

SUMMARY OF THE INVENTION

Accordingly, the present invention has been made to solve the above-mentioned problems occurring in the prior art. An object of the present invention is to provide a method and a system of calculating a sales commission in on-line by reflecting both sales of a member receiving the sales commission and news sales of sub-members on calculating the sales commission of the member, and a record medium thereof.

Another object of the present invention is to provide a method and a system of calculating a sales commission in on-line, which can be stably managed by constantly maintaining the total sales commissions paid to members at a predetermined ratio without an influence from the enlargement of a tree and new sales, and a record medium thereof.

According to one aspect of the present invention to accomplish the above objects, a method of calculating a sales commission in on-line through a wire/wireless communication network to distribute new sales, which are obtained according to purchase of articles or services by a sub-member, to a member positioned in an upper layer of the sub-member includes selecting the member positioned in the upper layer of the sub-member, who has made the new sales when purchasing articles or services after access through the wire/wireless communication network, as a sales commission receiving member, extracting a transformation coefficient corresponding to sales of the sales commission receiving member, dividing sub-members subordinate to a lower layer of the sales commission receiving member into two groups, comparing total new sales of the two groups with each other to select a group having lower total new sales, calculating transformation sales of the sales commission receiving member by multiplying the total new sales of the selected group by the transformation coefficient, calculating an n value obtained by dividing total sales commissions by total transformation sales, the total sales commissions being obtained by multiplying total new sales of all members, who have created new sales, by a preset commission payment rate, and paying a resultant value, which is obtained by multiplying the transformation sales of the sales commission receiving member by the n value, as a sales commission to the sales commission receiving member, thereby calculating the sales commission based on both the sales of the sales commission receiving member and the new sales of the sub-member to pay the sales commission to the sales commission receiving member.

After sales commission receiving member selecting has been performed, if at least two sales commission receiving members exist, steps from the transformation coefficient extracting to the transformation sales obtaining repeat corresponding to a number of the sales commission receiving members.

The sales commission receiving member satisfies a minimum qualification condition required by a company and qualifies to receive a sales commission when new sales are created from a left or right group below the sales commission receiving member.

The sales of the sales commission receiving member and the new sales of the sub-member are obtained during a period of time preset by a company.

The sales of the sale commission receiving member are used as the transformation coefficient.

According to another aspect of the present invention, a system of calculating a sales commission includes a member selecting module that selects a member positioned in an upper layer of a sub-member, who purchase articles or services through a wire/wireless communication network, as a sales commission receiving member, and divides sub-members subordinate to a lower layer of the sales commission receiving member into two groups, a transformation coefficient module that extracts a transformation coefficient corresponding to sales of the sales commission receiving member, a transformation sales calculating module that compares total new sales of the two groups with each other to select a group having lower total new sales, and calculates transformation sales of the sales commission receiving member by multiplying the total new sales of the selected group by the transformation coefficient, a parameter acquiring module that acquires an n value obtained by dividing total sales commissions by total transformation sales of sales commission receiving members, the total sales commission being obtained by multiplying total new sales of all members, who have created new sales, by a preset commission payment rate, and a payment module that pays a resultant value, which is obtained by multiplying the transformation sales of each sales commission receiving member by the n value, as a sales commission to the sales commission receiving member.

The transformation coefficient and the commission payment rate are defined by a user.

The transformation coefficient module and the transformation sales calculating module are repeatedly operated corresponding to a number of the sales commission receiving members.

According to still another aspect of the present invention, a computer readable record medium having a program executing a method including selecting a member, who is positioned in an upper layer of a sub-member purchasing articles or services, as a sales commission receiving member, extracting a transformation coefficient corresponding to sales of the sales commission receiving member, dividing sub-members subordinate to a lower layer of the sales commission receiving member into two groups, comparing total new sales of sub-members belonging to the two groups with each other to select a group having the lower total new sales, multiplying the total new sales of the selected group by the transformation coefficient to calculate transformation sales of the sales commission receiving member, calculating total transformation sales of sales commission receiving members, calculating an n value obtained by dividing total sales commissions by the total transformation sales, the total sales commission being obtained by multiplying total new sales of all members, who have created new sales, by a preset commission payment rate, and paying a resultant value, which is obtained by multiplying the transformation sales of each sales commission receiving member by the n value, to the sales commission receiving member as a sales commission.

The method further includes receiving the transformation coefficient and the commission payment rate from a user.

The method further includes repeating steps from the transformation coefficient extracting to the transformation sales acquiring corresponding to a number of the sales commission receiving members.

As described above, according to one embodiment of the present invention, members receive sales commissions based on members' own sales, so that old sub-members as well as new members actively sell commodities. Accordingly, the property of the tree to which the members belong is more increased, so that the members can have reliability and affection for a company.

In addition, since members receive sales commissions based on members' own sales, old members repeatedly purchase or sell commodities in order to increase the sales commissions. Accordingly, the revenue of the members is more increased, and a company can attempt to increase sales and members.

Further, a company can determine sales commissions paid to members at a constant commission payment rate in relation to the sales of the members without being affected by the enlargement of an organization due to the increase of the members and the amount of sales. Accordingly, the sales commissions can be prevented from being excessively paid, so that the company can be stably operated.

In addition, the company can adjust a transformation coefficient corresponding to each sales section entered by members to reasonably adjust the deviation between sales commissions, thereby promoting the sale will of members.

DETAILED DESCRIPTION OF THE PREFERRED EMBODIMENTS

Hereinafter, preferred embodiments of the present invention will be described in detail with reference to accompanying drawings and tables. In the following description of the present invention, a detailed description of known functions and configurations incorporated herein will be omitted when it may make the subject matter of the present invention rather unclear.

<Method of Calculating Sales Commission In On-Line>

Figure 5:
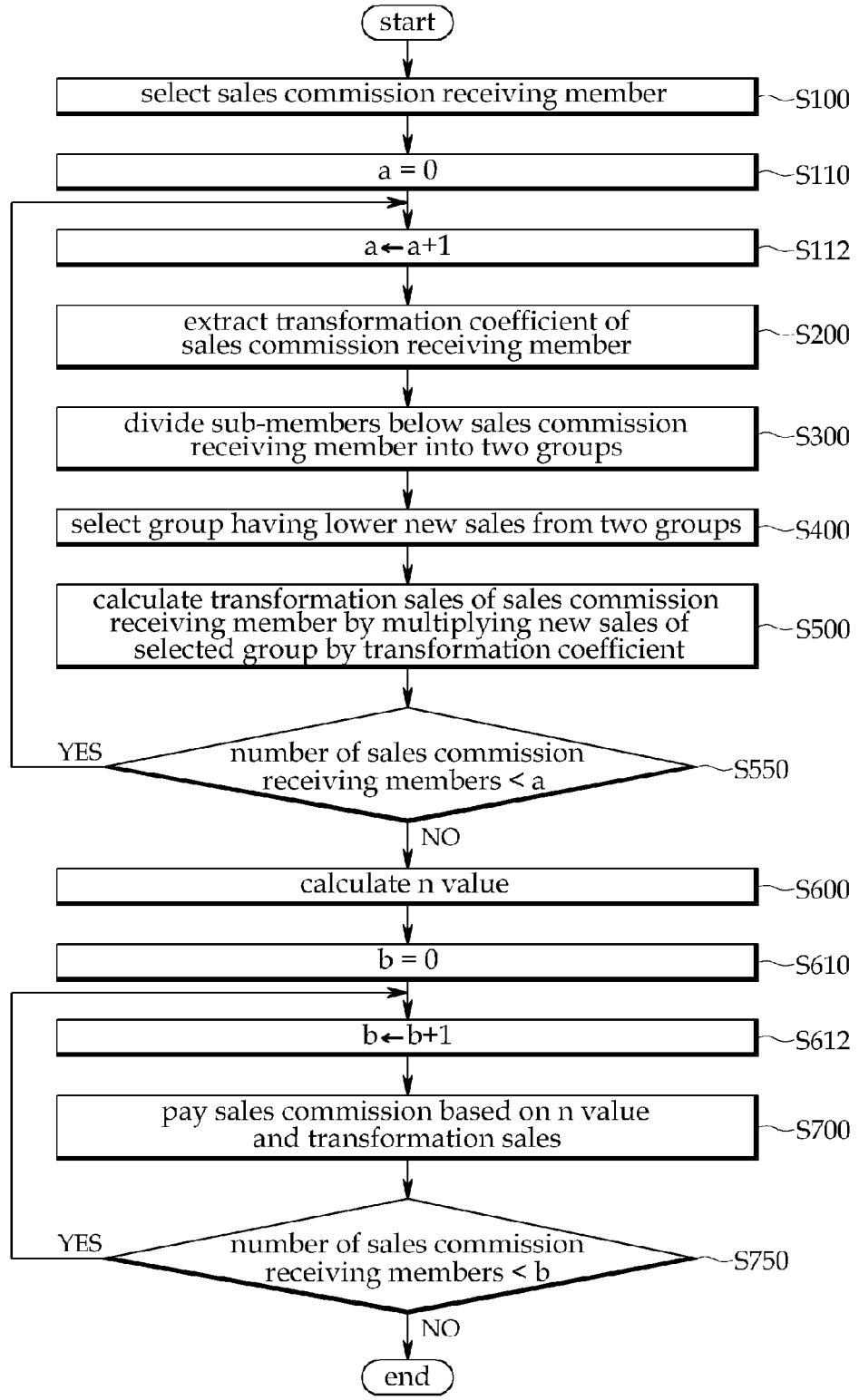
FIG. 5 is a flowchart showing a method of calculating a sales commission using a transformation coefficient according to the present invention.
Figure 6:
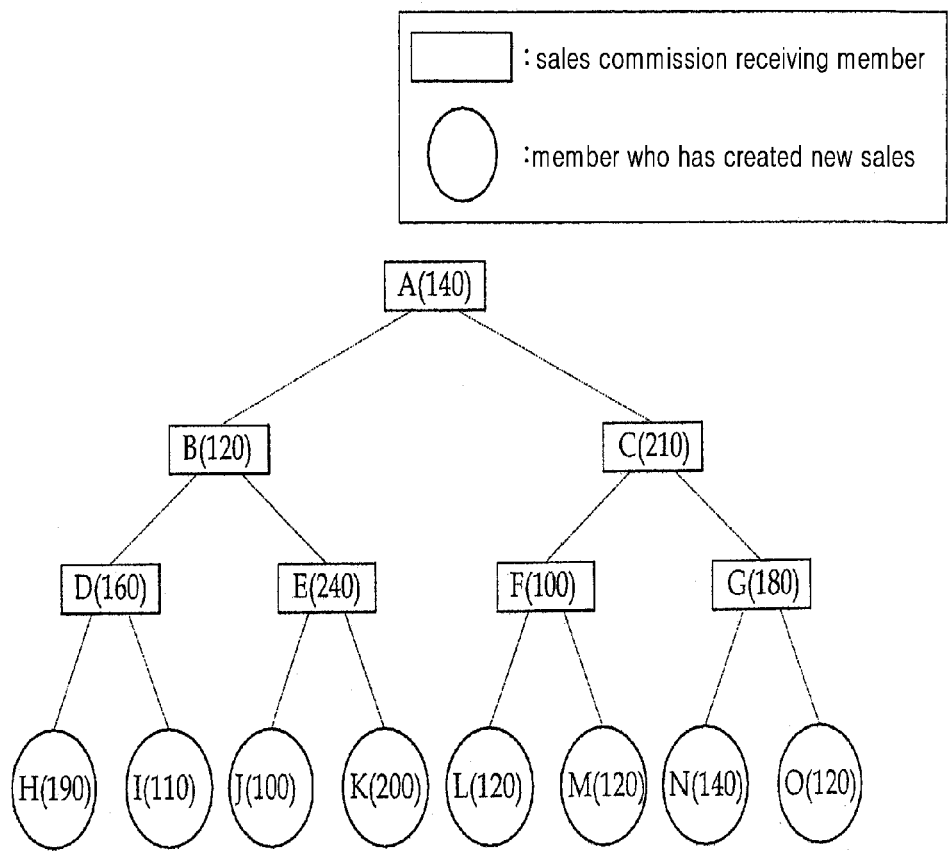
FIG. 6 is a view showing a tree to which the method of calculating a sales commission according to the present invention is applied.
Figure 8:
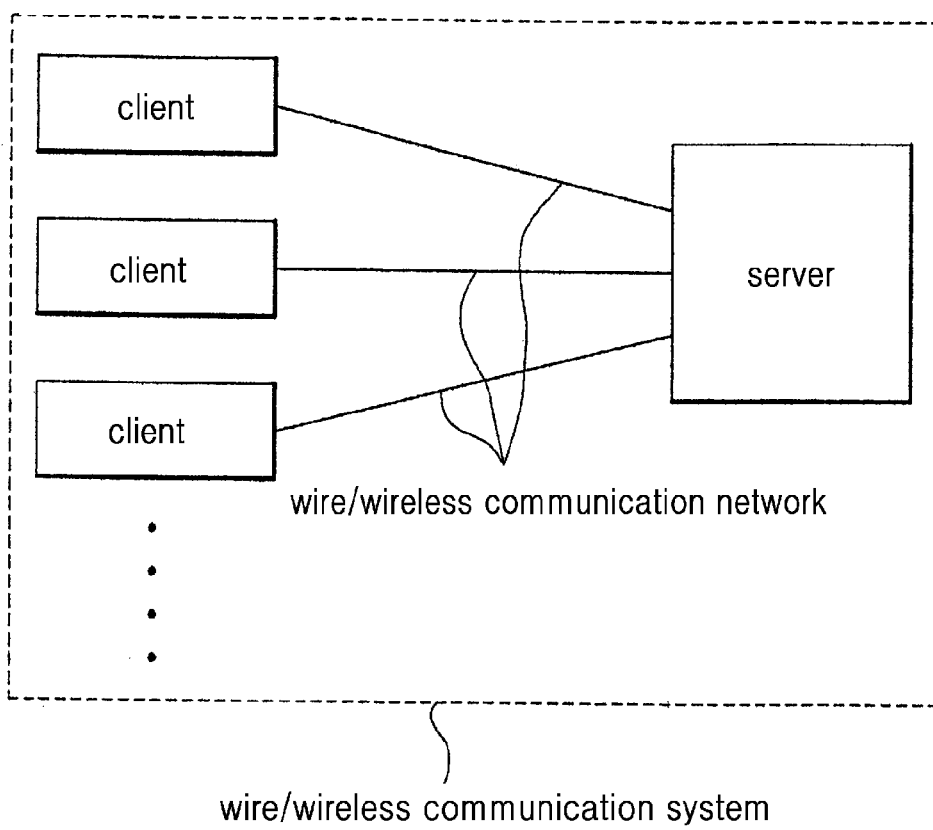
FIG. 8 is a block diagram showing a wire/wireless communication system executing the method of calculating a sales commission according to the present invention.

FIG. 5 is a flowchart showing a method of calculating a sales commission in on-line by using a transformation coefficient according to the present invention, and FIG. 6 is a view showing a tree to which the method of calculating a sales commission in on-line according to the present invention is applied. In addition, FIG. 8 is a view showing the structure of a wire/wireless communication system employing the method of calculating a sales commission in on-line according to the present invention. In the following description, the term "sales commission receiving member" refers to a member qualified to receive a sales commission, and the term "new sales" refers to a new sales performance entered by members belonging to a tree. The new sales may be made due to the purchase of articles or services by new members. The new sales may be made due to the repeated purchase of old members. However, according to the present invention, for the purpose of explanation, the new sales are based on only new sales resulting from the purchase of new members in the lowermost layer of the tree. The term "sales" refers to the total money or points given to members when the members purchase articles or services from on-line vendors connected through a wire/wireless communication network.

Hereinafter, a case in which the method of calculating a sales commission in on-line according to the present invention is adapted to a tree having 15 members A to O as shown in FIG. 6 will be described. As shown in FIG. 6, numbers in round brackets beside members represent sales of the members entered by the members after the members have purchased articles or services through access to online vendors operated by a company via a wire/wireless communication network.

As shown in FIGS. 5 and 6, when new sales are made by new members H to O in the lowermost layer of the tree, the sales commissions for the new sales are calculated and then paid to members above the lowermost layer members. To this end, first, the members above the lowermost layer members who have made new sales are selected as sales commission receiving members (step S100). In the tree of FIG. 6, the sales commission receiving members correspond to members A to G. When selecting the sales commission receiving members, the minimum qualification condition (e.g., the minimum sales, or the minimum number of times for purchases) may be established. The minimum qualification condition may be defined by a user using the method and system of calculating a sales commission and a record medium thereof according to the present invention. According to the present embodiment, the minimum sales of 100 may be set as the minimum condition to select sales commission receiving members.

After the sales commission receiving members have been selected, transformation coefficients are extracted according to the sales of the sales commission receiving members (step S200). The transformation coefficients may be preset by the user. The transformation coefficient may be defined by setting predetermined sales or a predetermined sales section.

For example, as shown in table 1, the sales are divided into sale amount and sales sections and a transformation coefficient may be set with respect to each sale amount and sale section. According to the present invention, the sales section will be described based on a transformation coefficient. As shown in table 1, transformation coefficients may be set at an equivalent interval. If the sales is highly achieved, the transformation coefficients are set at a greater interval.

TABLE 1

| Sales | | 100<br>100~119 | 120<br>120~139 | 140<br>140~159 | 160<br>160~179 | 180<br>180~199 | 200<br>200~219 | 220<br>220~239 | 240<br>240~259 | 260<br>260~279 | ... |
|---|---|---|---|---|---|---|---|---|---|---|---|
| Transformation coefficient | No. 1 | 1 | 2 | 3 | 4 | 5 | 6 | 7 | 8 | 9 | ... |
| | No. 2 | 1 | 1.5 | 2.0 | 2.5 | 3.0 | 3.5 | 4.0 | 4.5 | 5.0 | ... |
| | No. 3 | 1 | 1.1 | 1.2 | 1.3 | 1.4 | 1.5 | 1.6 | 1.7 | 1.8 | ... |

Hereinafter, transformation coefficients for the members A to G who are sales commission receiving members will be described below. In the case of No. 1 in table 1, since the sales of the member A is 140, a corresponding transformation coefficient is 3. Since the sales of the member B is 120, a corresponding transformation coefficient is 2. Since the sales of the member C is 210, a corresponding transformation coefficient is 6. Since the sales of the member D is 160, a corresponding transformation coefficient is 4. Since the sales of the member E is 240, a corresponding transformation coefficient is 8. Since the sales of the member F is 100, a corresponding transformation coefficient is 1. Since the sales of the member G is 180, a corresponding transformation coefficient is 5.

Figure 1:
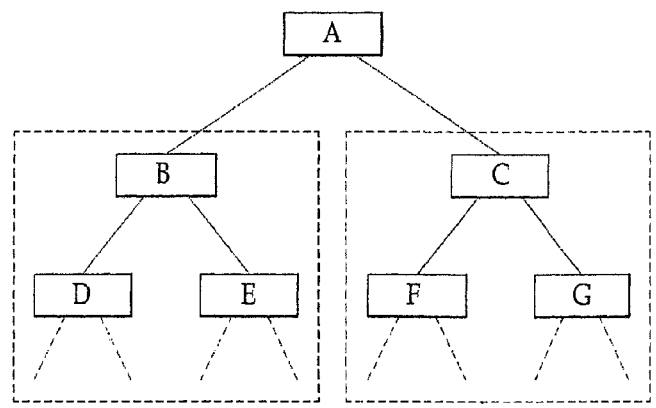
FIG. 1 is a view showing a membership tree employing a binary plan in a narrow sense as one example of sales schemes of a network business.
Figure 2A:
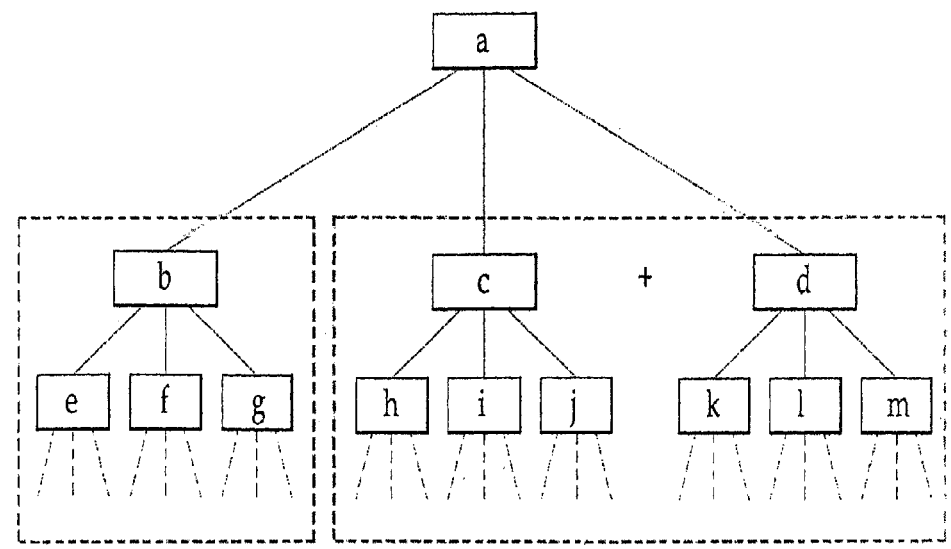
FIG. 2 is a view showing a membership tree employing a binary panel in a wide sense as one example of sales schemes of a network business.
Figure 2B:
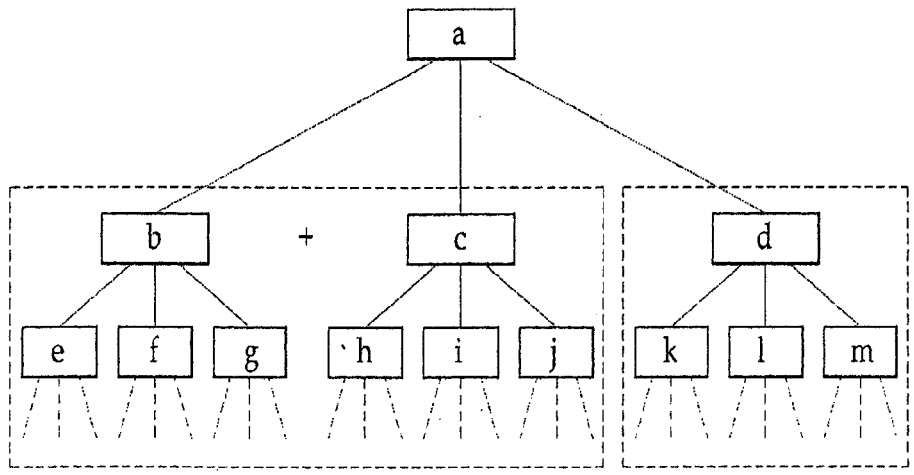
Figure 3:
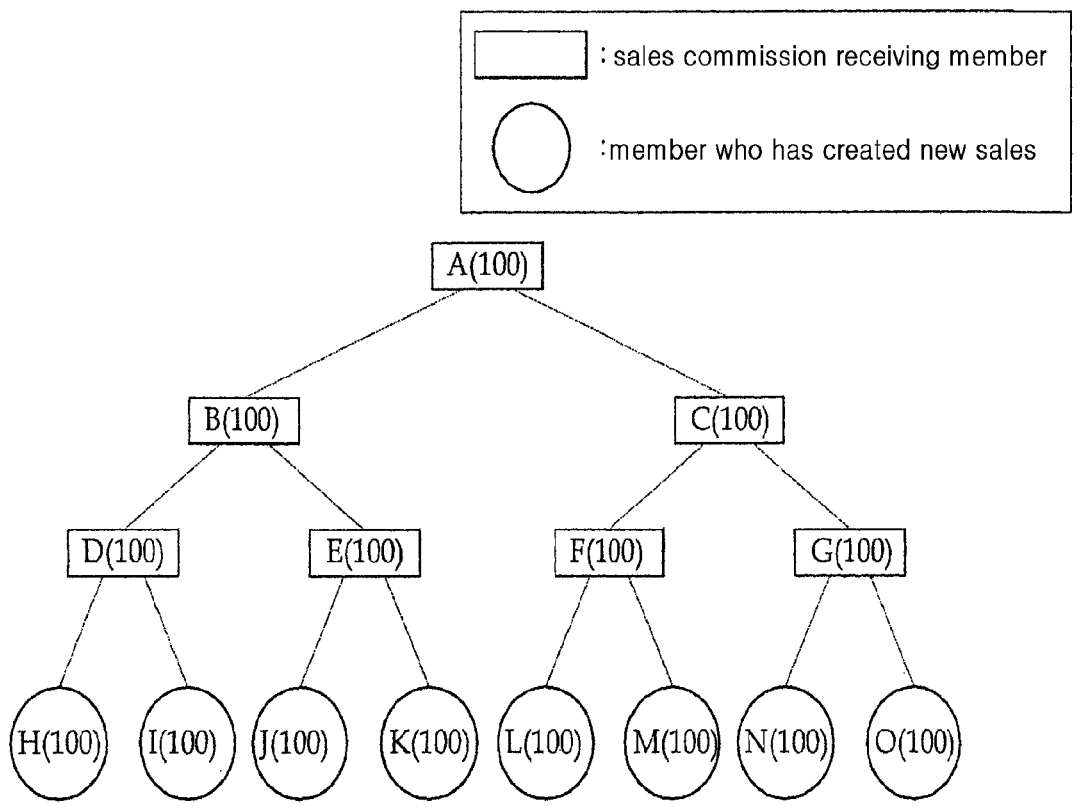
FIGS. 3 and 4 are views showing sales of members on a membership tree employing the binary plan in the narrow sense as one example of sales schemes in a network business.
Figure 4:
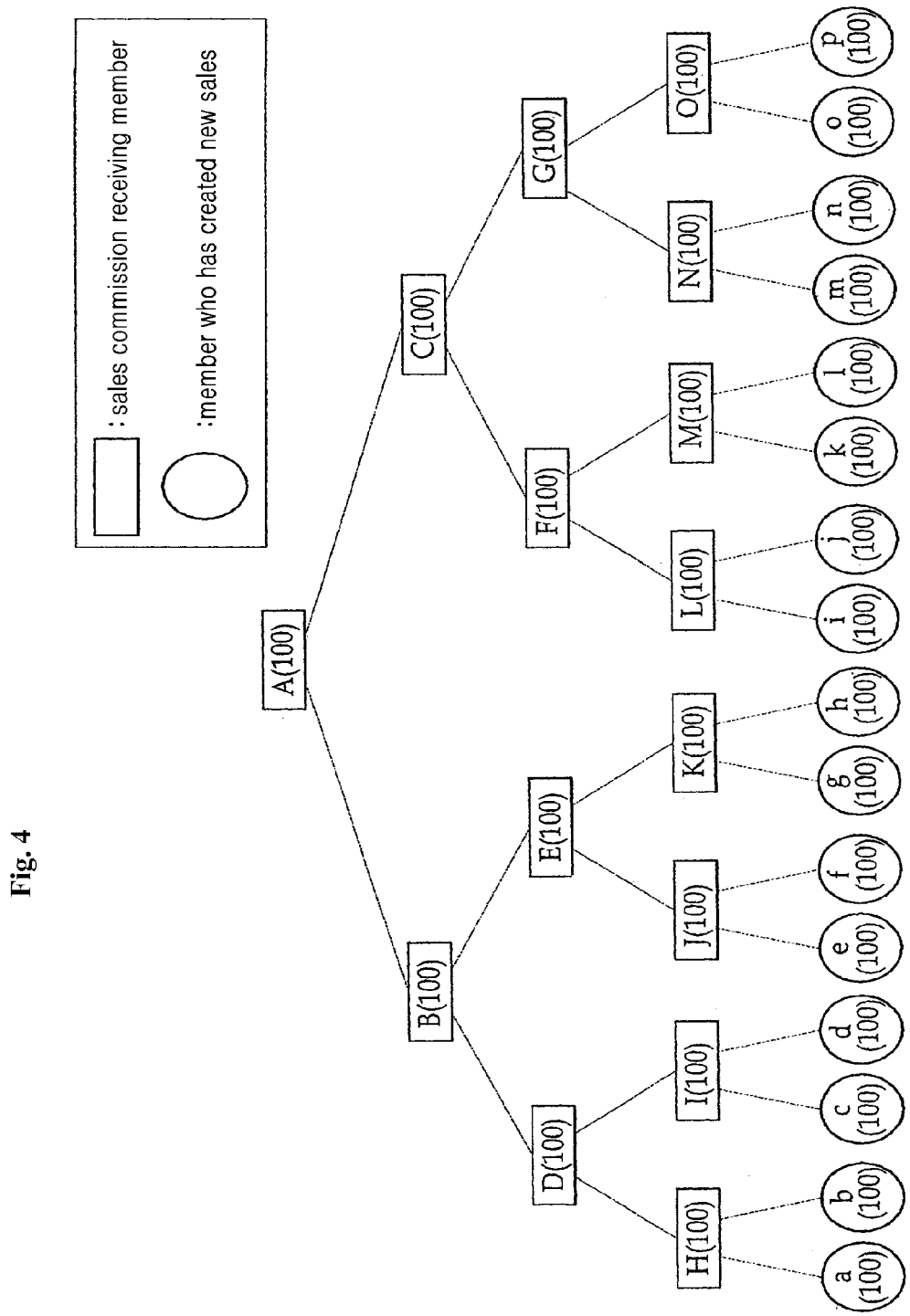

If the transformation coefficient is extracted, sub-members positioned below each sales commission receiving member are grouped into two (step S300). Then, the sums of new sales of members belonging to two groups are compared with each other. After the comparison, a group having the lower sum of sales is selected (step S400). As shown in FIG. 6, if two sub-tree organizations are branched from each member, each sub-tree organization may be grouped. If at least two (e.g., three) sub-trees are branched from the tree as shown in FIG. 3, the sub-trees can be grouped into two based on a predetermined criterion. As shown in FIG. 6, in the case of the member A, the total new sales made by the left group (members B, D, E, H, I, J and K) are 600, and the total new sales made by the right group (members C, F, G, L, M, N, and O) are 500. Accordingly, the right group is selected. In the case of the member B, the total new sales made by the left group (members D, H, and I) and the total new sales made by the right group (members E, J, and K) are 300. Accordingly, the left group or the right group may be selected. Similarly, after performing grouping with respect to members C, D, E, F, and G, one group is selected.

The total new sales of the selected group are multiplied by the transformation coefficient, and the result value becomes transformation sales of a member (i.e., sales commission receiving member) positioned in the upper layer of the selected group. In the tree of FIG. 6, the number of the sales commission receiving members is 7 (members A to G). The process of selecting a group and calculating transformation sales is performed with respect to each sales commission receiving member. Accordingly, the process of selecting the group and calculating the transformation sales is performed seven times in total. The transformation sales for each sales commission receiving member is shown in table 2.

TABLE 2

| Sales commission receiving member | Total new sales of selected group (①) | Transformation coefficient (②) | Transformation sales (① * ②) |
|---|---|---|---|
| Member A | 500 | 3 | 1500 |
| Member B | 300 | 2 | 600 |
| Member C | 240 | 6 | 1440 |

TABLE 2-continued

| Sales commission receiving member | Total new sales of selected group (①) | Transformation coefficient (②) | Transformation sales (① * ②) |
|---|---|---|---|
| Member D | 110 | 4 | 440 |
| Member E | 100 | 8 | 800 |
| Member F | 120 | 1 | 120 |
| Member G | 120 | 5 | 600 |

As described above, the member A who is a sales commission receiving member has two sub-groups including members B, D, E, H, I, J, and K, and members C, F, G, L, M, N, and O. Between the two groups, the group including members C, F, G, L, M, N, and O has the lower sum of new sales. Accordingly, the sum ① of new sales is 500. If this sum ① of the new sales is multiplied by a transformation coefficient ②, the transformation sales of the member A are calculated as 1500. The member B has two sub-groups including members D, H, and I and members E, J, and K. Even if any one of the two sub-groups may be selected as a group having the lower sum of new sales, the same result is obtained. Accordingly, in table 2, the sum ① of the new sales is 300. If the total new sales ① are multiplied by the transformation coefficient ②, the transformation sales are calculated as 600. In the same manner, the transformation sales of the members D to G are calculated, and the result is shown in table 2.

Thereafter, in the tree of FIG. 6, the total new sales for all of members H to O who have created new sales are calculated. Then, the calculated value is multiplied by a commission payment rate preset by a user, and multiplied by an inverse value of the total transformation sales to calculate n value (step S600). The n value may be expressed through equation 1. The n value is a parameter used to calculate sales commissions for sales commission receiving members. In addition, if the total new sales for all members who have created new sales are multiplied by the commission payment rate preset by the user, the result becomes the total sales commissions paid to sales commission receiving members.

(Total new sales of all members who have created new sales*commission payment rate (%))/total transformation sales=$n$                    Equation 1

The total new sales of all members who have created new sales in the tree of FIG. 6 are (new sales of the member H)+(new sales of the member I)+(new sales of the member J)+(new sales of the member K)+(new sales of the member L)+(new sales of the member M)+(new sales of the member N)+(new sales of the member O). Accordingly, the total new sales of the members=190+110+100+200+120+120+140+120=1100.

The total transformation sales of sales commission receiving members shown in table 2 is 5500, and the commission payment rate according to the present embodiment 20%. Accordingly, if these values are substituted into Equation 1, the n value is 0.04.

1100/5500*0.2=0/04

Thereafter, a sales commission for each sales commission receiving member is calculated based on the n value (step S700). The sales commission receiving members are the members A to G (in total, 7 members) selected in step S100. The sales commission to be paid to each sales commission receiving member is calculated by multiplying the transformation sales for each sales commission receiving member by the n value.
The result is shown in table 3.

TABLE 3

| Sales commission receiving member | Transformation sales (③) | n value (④) | Sales commission to be paid (③ * ④) |
|---|---|---|---|
| Member A | 1500 | 0.04 | 60 |
| Member B | 600 | 0.04 | 25 |
| Member C | 1440 | 0.04 | 57.6 |
| Member D | 440 | 0.04 | 17.6 |
| Member E | 800 | 0.04 | 32 |
| Member F | 120 | 0.04 | 4.8 |
| Member G | 600 | 0.04 | 24 |
| | | total | 220 |

In other words, the members A to G receive sales commissions of 60, 25, 57.6, 17.6, 32, 4.8, and 24, respectively. The sales commission to be paid to each sales commission receiving member is based on the sales of the sales commission receiving member and new sales of the sub-group of the sales commission receiving member. The sales commission may be paid in cash or points.

According to another embodiment of the present invention, if transformation coefficients belonging to the case of No. 2 in table 1 are used and the above procedure is repeated, the result is shown in table 4.

TABLE 4

| Sales commission receiving member | Total new sales of selected group (①) | Transformation coefficient (②) | Transformation sales (③) | n value (④) | Sales commission to be paid |
|---|---|---|---|---|---|
| Member A | 500 | 2.0 | 1000 | 0.063 | 62.9 |
| Member B | 300 | 1.5 | 450 | 0.063 | 28.3 |
| Member C | 240 | 3.5 | 840 | 0.063 | 52.9 |
| Member D | 110 | 2.5 | 275 | 0.063 | 17.3 |
| Member E | 100 | 4.5 | 450 | 0.063 | 28.3 |
| Member F | 120 | 1.0 | 120 | 0.063 | 7.6 |
| Member G | 120 | 3.0 | 360 | 0.063 | 22.7 |
| | | total | 3495 | total | 220 |

According to the present embodiment, since the total transformation sales are 3495, the n value based on Equation 1 is about 0.063. As described above, the sales commission for each sales commission receiving member is calculated by multiplying the n value by the transformation sales of the sales commission receiving member. According to the present embodiment, the total paid sales commissions are 220 corresponding to 20% of the whole new sales.

According to another embodiment of the present invention, if transformation coefficients belonging to the case of No. 3 in table 1 are used and the above procedure is repeated, the result is shown in table 5.

TABLE 5

| Sales commission receiving member | Total new sales of selected group (①) | Transformation coefficient (②) | Transformation coefficient (③) | n value (④) | Sales commission to be paid |
|---|---|---|---|---|---|
| Member A | 500 | 1.2 | 600 | 0.116 | 69.80 |
| Member B | 300 | 1.1 | 330 | 0.116 | 38.39 |
| Member C | 240 | 1.5 | 360 | 0.116 | 41.88 |
| Member D | 110 | 1.3 | 143 | 0.116 | 16.64 |
| Member E | 100 | 1.7 | 170 | 0.116 | 19.78 |
| Member F | 120 | 1.0 | 120 | 0.116 | 13.96 |
| Member G | 120 | 1.4 | 168 | 0.116 | 19.55 |
| | | total | 1891 | total | 220 |

According to the present embodiment, since the total transformation sales are 1891, the n value based on Equation 1 is about 0.116. As described above, the sales commission for each sales commission receiving member is calculated by multiplying the n value by the transformation sales of the sales commission receiving member. According to the present embodiment, the total paid sales commissions are 220 corresponding to 20% of the whole new sales.

According to the method of calculating a sales commission in on-line by using a transformed efficiency, differently from the typical binary plan, sales commissions paid to all sales commission receiving members are exactly matched with a commission payment rate preset by a company. Accordingly, sales commissions do not exceed new sales, so that the management of the company can be stabilized. This can be confirmed from table 6 by comparing sales commissions calculated through the typical sales commission calculating scheme with sales commissions calculated according to the embodiment of the present invention in the tree of FIG. 6.

TABLE 6

| Sales commission receiving member | Sales | Total new sales of selected group | Sales commission through typical scheme of calculating sales commission | Sales commission through scheme of calculating sales commission of the present invention | | |
|---|---|---|---|---|---|---|
| | | | | No. 1 | No. 2 | No. 3 |
| Member A | 140 | 500 | 100 | 60 | 62.9 | 69.80 |
| Member B | 120 | 300 | 60 | 24 | 28.3 | 38.39 |
| Member C | 210 | 240 | 48 | 57.6 | 52.9 | 41.88 |
| Member D | 160 | 110 | 22 | 17.6 | 17.3 | 16.64 |
| Member E | 240 | 100 | 20 | 32 | 28.3 | 19.78 |
| Member F | 100 | 120 | 24 | 4.8 | 7.6 | 13.96 |
| Member G | 180 | 120 | 24 | 24 | 22.7 | 19.55 |
| | | total | 298 | 220 | 220 | 220 |

In the tree of FIG. 6 in which the sales of members are not constant, when a company calculates sales commissions at a lower-sales related payment rate of 20% similarly to the typical sales commission calculating scheme, the ratio of the sum (298) of sales commissions to the sum (1100) of new sales is 27.1% as shown in table 6. Accordingly, even if not only be the sales of members constant, but also the sales of the members are not constant, the ratio of the sales commission to new sales cannot be specified as a constant ratio.

According to the present invention, as shown in table 6, even if transformed coefficients are changed, the total sales commissions paid to the whole sales commission receiving members are not changed, and the total sales commissions are always maintained at the commission payment rate for new sales, which is preset by the company.

As shown in table 6, in several examples of the method of calculating the sales commission using a transformation coefficient according to the present invention, as the level of a transformation coefficient (e.g., No. 1) for each sales section is increased, sales of a member is more important than new sales of sub-members when calculating the sales commission for the member. In contrast, as the size of transformation coefficient (e.g., No. 1) for each sales section is reduced, the new sales of the sub-members are more important than the sales of the member when calculating the sales commission for the member. Accordingly, a user can variably set the size of a transformation coefficient such that a sales commission receiving member who has achieved greater sales can receive a more sales commission. In other words, the user sets the transformation coefficient suitable for the characteristic of the company of the user to reasonably adjust the deviation between sales commissions of members, thereby boosting the sale will of the members.

In the typical scheme of calculating a sales commission, only new sales of sub-organizations of the sales commission receiving member are reflected on calculating a sales commission of the sales commission receiving member except for sales of the sales commission receiving member. Accordingly, members satisfy only the minimum condition of sales. In addition, since the repeated purchase or the sale activity of the members is not attracted, sales are not increased from the repeated purchase or the sale activity. In contrast, according to the present invention, the transformation coefficients are variously set, so that the deviation between sales commissions can be adjusted. In addition, since the sales of the sales commission receiving member is an important factor in addition to new sales of sub-organizations of the sales commission receiving member when calculating the sales commission for the sales commission receiving member, the repeated purchase or the sale activity of old members is increased. Accordingly, the revenue of members can be increased and the sales of the company can be increased.

In particular, according to the typical scheme of calculating sales commission, the member E having the highest sales (240) receives the lowest sales commission (20) because only new sales of a group having lower new sales is reflected on calculating the sales commission. In contrast, according to the embodiment of the present invention, when calculating the sales commission for the member E, the sales of the member E are reflected with the new sales of the group having the lower new sales. Particularly, in the case of No. 1 and No. 2, the member E receives 32 thousand won and 28.3 thousand won, respectively. In other words, the member E receives a sales commission greater than that of the member D (110), the member F (120), or the member G (120), who have new sales greater than that (100) of the member E. In the case of the members F and G, selected groups for the members F and G have the same sales (120). Accordingly, the same sales commission (120) is calculated according to the typical scheme of calculating a sales commission. However, according to the present invention, the member G who has achieved sales greater than that of the member F receives a sales commission greater than that of the member F. Therefore, this result leads old members as well as new members in the lowermost layer to increase sales of the old and new members, so that the old members may have a desire to grow a sub-organization of the old members.

The method of calculating a sales commission in on-line may be adapted based on sales entered by sales commission receiving members and new members during a predetermined period of time (e.g., a day, a week, a month, or three months). For example, a transformation coefficient may be calculated based on the total sales entered by the sales commission receiving member during a month, and a group may be selected based on the total new sales entered by new members during a month. During this period of time, new sales resulting from the repeated purchase of the old members are reflected on calculating a sales commission for a member in the upper layer similarly to the principle of reflecting new sales according to the present invention. The period of time may be set suitably for the administration aim of a user's company.

<System of Calculating Sales Commission>

Figure 7:
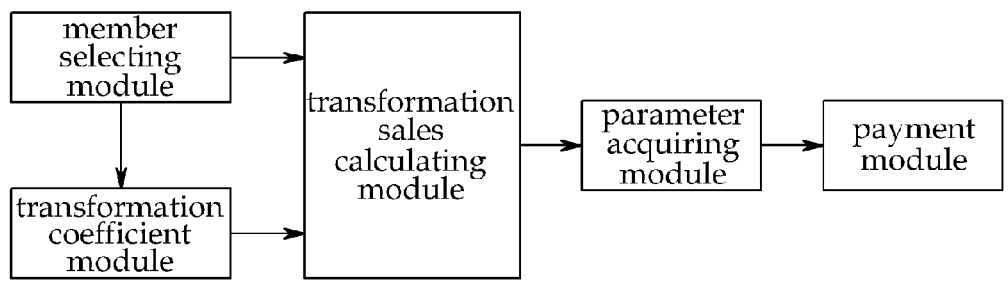
FIG. 7 is a schematic block diagram showing a system of calculating the sales commission according to the present invention.

FIG. 7 is a schematic block diagram of the system of calculating a sales commission used to realize the method of calculating the sales commission in on-line by using a transformation coefficient according to the present invention. The system of calculating the sales commission according to the present invention includes a member selecting module, a transformation coefficient module, a transformation sales calculating module, a parameter acquiring module, and a payment module.

Since the system of calculating the sales commission according to the present invention is utilized through the access based on a wire/wireless communication network, the system includes communication equipment such as a web server providing access information through a web browser and transfer protocols and a web server managing a web browser of wireless Internet based on a WAP scheme like a mobile communication terminal, a smart phone, or a PDA.

The member selecting module selects members positioned at the upper layer of a member, who purchases articles or services during a predetermined period of time, in a tree including the member and designates the selected members as sales commission receiving members. The sales commission receiving members may be selected based on the minimum qualification condition described above. The member selecting module divides a tree positioned below each sales commission receiving member into two groups. If the two groups are trees employing the binary plan shown in FIG. 6, an organization subordinate to the left or the right tree is selected as one group as described above.

The transformation sales calculating module assigns a transformation coefficient to a sales commission receiving member selected by the member selecting module. The transformation coefficient is based on sales entered by the sales commission receiving member during a predetermined period of time. The transformation coefficient may be defined by a user (i.e., company).

The transformation sales calculating module calculates transformation sales of each sales commission receiving member based on the sales and the transformation coefficient of the sales commission receiving member. The transformation sales are calculated by multiplying the sales of the sales commission receiving member by the transformation coefficient. The transformation sales are used to calculate the n value that is a parameter used to calculate a sales commission.

The parameter acquiring module multiplies the total new sales of all members, which have made the new sales, by a commission payment rate preset by a company, and divides the result by the total transformation sales obtained from the transformation sales calculating module, thereby calculating the n value. In other words, the parameter acquiring module acquires the n value based on Equation 1. The n value acquired by the parameter acquiring module is an important variable to determine a sales commission of the sales commission receiving member. The commission payment rate may be defined by the user.

The payment module calculates the sales commission of the sales commission receiving member by multiplying the n value from the parameter acquiring module by the transformation sales of each sales commission receiving member, and pays the sales commission to the sales commission receiving member in cash or points.

<Record Medium>

The method of calculating a sales commission in on-line by using a transformation coefficient described above may be realized by using a computer readable record medium. The computer readable record medium stores program codes and commands to execute step S100 of selecting a member, who is positioned above a sub-member making new sales when purchasing articles or services after access through a wire/wireless communication network, as a sales commission receiving member, step S200 of extracting a transformation coefficient corresponding to sales of the sales commission receiving member, steps S300 and S400 of dividing members subordinate to the sales commission receiving member into two groups, comparing the sums of new sales of members belonging to the two groups with each other, and then selecting a group having the lower sum of new sales, step S500 of multiplying the total new sales of the selected group by a transformation coefficient to calculate transformation sales of the sales commission receiving member, step S600 of calculating an n value obtained by dividing the total sales commissions by the total transformation sales, in which the total sales commissions are obtained by multiplying the total new sales of all members, who have created the new sales, by a commission payment rate, and step S700 of paying a result, which is obtained by multiplying transformation sales of each sales commission receiving member by the n value, as a sales commission of the sales commission receiving member. Since the transformation coefficient extracting step to the transformation sales calculating step must be repeatedly performed by the number of sales commission receiving members, the present record medium preferably includes programs and commands to execute this.

The program codes or commands stored in the record medium enable the process of the method of calculating a sales commission in on-line by using a transformation coefficient described above.

The present record medium may store program codes and commands to execute a step of receiving a transformation coefficient from a user (e.g., company). The user or company may reasonably define the transformation coefficient based on sales propensity and performance of members and the deviation of sales commissions of the members. In addition, since the commission payment rate may be defined by the user, the record medium may store program codes or commands to execute this.

For example, the record medium includes a floppy disk, a hard disk, a magnetic reel tape, an optical disk (e.g., CD, DCD, or Blue-ray disk), and a semiconductor memory (e.g., RAM, ROM, EEPROM, USB memory, CF memory, SD memory). The present invention is not limited to the record media listed above. The record media according to the present invention may include various media which enable electric data to be recorded and retained and can be read out by a computer.

Another Embodiment

Although the present invention has been described about a method and a system of calculating a sales commission in on-line by using a transformation coefficient, the numeral value of sales entered by each sales commission receiving member may be used as the transformation coefficient according to another embodiment of the present invention. A user may define sales entered by each sales commission receiving member as the transformation coefficient.

According to the another embodiment of the present invention, the numeral value of sales entered by each sales commission receiving member may be used as the transformation coefficient in the tree shown in FIG. 6, and the above-described procedure is repeated. Accordingly, the results are shown in table 7.

TABLE 7

| Sales commission receiving member | Total new sales of selected group (①) | Transformation coefficient (=sales) (②) | Transformation coefficient (③) | n value (④) | Sales commission to be paid |
|---|---|---|---|---|---|
| Member A | 500 | 140 | 70,000 | 0.0009499 | 66.49 |
| Member B | 300 | 120 | 36,000 | 0.0009499 | 34.2 |
| Member C | 240 | 210 | 50,000 | 0.0009499 | 47.87 |
| Member D | 110 | 160 | 17,600 | 0.0009499 | 16.72 |
| Member E | 100 | 240 | 24,000 | 0.0009499 | 22.8 |
| Member F | 120 | 100 | 12,000 | 0.0009499 | 11.4 |
| Member G | 120 | 180 | 21,600 | 0.0009499 | 20.52 |
| | | total | 231,600 | total | 220 |

According to the present embodiment, since the numeral value of sales entered by each sales commission receiving member becomes the transformation coefficient, and the total transformation sales are 231,6000, the n value based on Equation 1 becomes about 0.0009499. If the transformation sales of the sales commission member are multiplied by the n value, a sales commission to be paid to the sales commission member is calculated as described above. According to another embodiment of the present invention, the total sales commissions paid to the sales commission receiving members become 220 corresponding to 20% of new sales.

According to still another embodiment of the present invention, when calculating a sales commission, new sales of sub-members of a sales commission receiving member, particularly, the total new sales of a selected group having lower new sales are changed into a predetermined grade. In other words, the changed grade is used instead of the total new sales of the selected group to calculate a sales commission through the above procedure according to the present invention.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A computer-implemented method of calculating a sales commission in on-line through a wire/wireless communication network integral to one or more computer systems to distribute new sales, which are obtained according to purchase of articles or services by a sub-member, to a member positioned in an upper layer of the sub-member, the method comprising:
  Selecting, the member positioned in the upper layer of the sub-member, who has made the new sales when purchasing articles or services after access through the wire/wireless communication network, as a sales commission receiving member;
  extracting a transformation coefficient stored in a memory of one or more computer systems and corresponding to sales of the sales commission receiving member;
  dividing sub-members subordinate to a lower layer of the sales commission receiving member into two groups;
  comparing, by a computer, total new sales of the two groups with each other to select a group having lower total new sales;
  calculating, by a computer, transformation sales of the sales commission receiving member by multiplying the total new sales of the selected group by the transformation coefficient;
  calculating an n value stored in a memory of one or more computer systems and obtained by dividing total sales commissions by total transformation sales, the total sales commissions being obtained by multiplying total new sales of all members, who have created new sales, by a preset commission payment rate; and
  paying a resultant value, which is obtained by multiplying the transformation sales of the sales commission receiving member by the n value, as a sales commission to the sales commission receiving member,
  wherein the sales commission is calculated based on both the sales of the sales commission receiving member and the new sales of the sub-member to pay the sales commission to the sales commission receiving member.

2. The method of claim 1, wherein, after sales commission receiving member selecting has been performed, if at least two sales commission receiving members exist, steps from the transformation coefficient extracting to the transformation sales obtaining repeat corresponding to a number of the sales commission receiving members.

3. The method of claim 1, wherein the sales commission receiving member satisfies a minimum qualification condition required by a company and qualifies to receive a sales commission when new sales are created from a left or right group below the sales commission receiving member.

4. The method of claim 1, wherein the sales of the sales commission receiving member and the new sales of the sub-member are obtained during a period of time preset by a company.

5. The method of claim 1, wherein the sales of the sale commission receiving member are used as the transformation coefficient.

6. A system of calculating a sales commission comprising:
  a member selecting module configured to select a member positioned in an upper layer of a sub-member, who purchase articles or services through a wire/wireless communication network integral to one or more computer systems, as a sales commission receiving member, and divides sub-members subordinate to a lower layer of the sales commission receiving member into two groups;
  a transformation coefficient module configured to extract a transformation coefficient stored in a memory of one or more computer systems corresponding to sales of the sales commission receiving member;
  a transformation sales calculating module configured to compare total new sales of the two groups with each other to select a group having lower total new sales, and calculates transformation sales of the sales commission receiving member by multiplying the total new sales of the selected group by the transformation coefficient;
  a parameter acquiring module configured to acquire an n value stored in a memory of one or more computer systems and obtained by dividing total sales commissions by total transformation sales of sales commission receiving members, the total sales commission being obtained by multiplying total new sales of all members, who have created new sales, by a preset commission payment rate;
  a payment module configured to pay a resultant value stored in a memory of one or more computer systems, which is obtained by multiplying the transformation sales of each sales commission receiving member by the n value, as a sales commission to the sales commission receiving member; and
  a processor for calculating the sales commission in association with the modules.

7. The system of claim 6, wherein the transformation coefficient and the commission payment rate are defined by a user.

8. The system of claim 6, wherein the transformation coefficient module and the transformation sales calculating module are repeatedly operated corresponding to a number of the sales commission receiving members.

9. One or more non-transitory computer-readable media having stored thereon instructions that, when executed on one or more processors, direct the one or more processors to perform operations for calculating a sales commission, the operations comprising:
  selecting a member, who is positioned in an upper layer of a sub-member purchasing articles or services, as a sales commission receiving member;
  extracting a transformation coefficient corresponding to sales of the sales commission receiving member;
  dividing sub-members subordinate to a lower layer of the sales commission receiving member into two groups;
  comparing total new sales of sub-members belonging to the two groups with each other to select a group having the lower total new sales;
  multiplying the total new sales of the selected group by the transformation coefficient to calculate transformation sales of the sales commission receiving member;
  calculating total transformation sales of sales commission receiving members;

calculating an n value obtained by dividing total sales commissions by the total transformation sales, the total sales commission being obtained by multiplying total new sales of all members, who have created new sales, by a preset commission payment rate; and paying a resultant value, which is obtained by multiplying the transformation sales of each sales commission receiving member by the n value, to the sales commission receiving member as a sales commission.

10. One or more computer-readable media as recited in claim 9, wherein the operations further comprises receiving the transformation coefficient and the commission payment rate from a user.

11. One or more computer-readable media as recited in claim 9, wherein the operations further comprises repeating steps from the transformation coefficient extracting to the transformation sales acquiring corresponding to a number of the sales commission receiving members.

12. The method of claim 2, wherein the sales commission receiving member satisfies a minimum qualification condition required by a company and qualifies to receive a sales commission when new sales are created from a left or right group below the sales commission receiving member.

13. The method of claim 2, wherein the sales of the sales commission receiving member and the new sales of the sub-member are obtained during a period of time preset by a company.

* * * * *